(12) United States Patent
Yamada et al.

(10) Patent No.: US 8,693,100 B2
(45) Date of Patent: Apr. 8, 2014

(54) METHOD OF MANUFACTURING LIGHT DIFFUSION FILM, LIGHT DIFFUSION FILM, POLARIZING PLATE, AND LIQUID CRYSTAL DISPLAY

(75) Inventors: Taku Yamada, Ibaraki (JP); Hin Hou, Ibaraki (JP); Kentarou Takeda, Ibaraki (JP)

(73) Assignee: Nitto Denko Corporation, Ibaraki-shi (JP)

( * ) Notice: Subject to any disclaimer, the term of this patent is extended or adjusted under 35 U.S.C. 154(b) by 803 days.

(21) Appl. No.: 12/555,541

(22) Filed: Sep. 8, 2009

(65) Prior Publication Data

US 2010/0060830 A1    Mar. 11, 2010

(30) Foreign Application Priority Data

Sep. 8, 2008 (JP) ................. 2008-229792

(51) Int. Cl.
*G02B 5/02* (2006.01)
(52) U.S. Cl.
CPC .................... *G02B 5/0221* (2013.01)
USPC ........................................................ 359/599
(58) Field of Classification Search
None
See application file for complete search history.

(56) References Cited

U.S. PATENT DOCUMENTS

| 6,483,561 B2 | 11/2002 | Maruyama et al. |
| 6,741,306 B2 | 5/2004 | Maruyama et al. |
| 6,964,814 B2 | 11/2005 | Fujii et al. |
| 2006/0052565 A1 | 3/2006 | Yoshioka et al. |
| 2007/0195431 A1* | 8/2007 | Asakura et al. ............... 359/707 |
| 2008/0153008 A1 | 6/2008 | Hayashi et al. |

FOREIGN PATENT DOCUMENTS

| JP | 7-098404 A | 4/1995 |
| JP | 7-281583 A | 10/1995 |
| JP | 10-010513 A | 1/1998 |
| JP | 2001-233611 A | 8/2001 |
| JP | 2001-343529 A | 12/2001 |
| JP | 2004-167827 A | 6/2004 |
| JP | 2005-077866 A | 3/2005 |
| JP | 2006-038902 A | 2/2006 |
| JP | 2006-133463 A | 5/2006 |

(Continued)

OTHER PUBLICATIONS

English machine translation of JP 2007-271673 A, retrieved from <http://dossier1.ipdl.inpit.go.jp/AIPN/odse_top_dn.ipdl?N0000=7400> on Jul. 19, 2012.*

(Continued)

*Primary Examiner* — Derek S Chapel
(74) *Attorney, Agent, or Firm* — Westerman, Hattori, Daniels & Adrian, LLP

(57) ABSTRACT

A method of easily manufacturing a light diffusion film by a continuous process, which achieves both good display properties and an increase in viewing angle when used in a liquid crystal display. A method of manufacturing a light diffusion film includes forming a laminate of an original light diffusion film and a photosensitive resin, wherein the photosensitive resin includes at least two types of materials that are different in refractive index from each other; and irradiating the laminate with a collimated laser beam from a side of the original light diffusion film, wherein a reflection hologram formation-preventing layer is located on a side of the laminate opposite from the side of irradiation of the laminate with a collimated laser beam. In the process of irradiating the laminate, the reflection hologram formation-preventing layer prevents formation of a reflection hologram on the photosensitive resin due to a reflected light from the irradiation.

15 Claims, 3 Drawing Sheets

(56) References Cited

FOREIGN PATENT DOCUMENTS

| | | |
|---|---|---|
| JP | 2007-271673 A | 10/2007 |
| WO | 01/37007 A1 | 5/2001 |
| WO | 2005/078483 A1 | 8/2005 |

OTHER PUBLICATIONS

Japanese Office Action dated Feb. 21, 2012, issued in corresponding Japanese Patent Application No. 2008-229792.(w/partial English translation).

* cited by examiner

METHOD OF MANUFACTURING LIGHT DIFFUSION FILM, LIGHT DIFFUSION FILM, POLARIZING PLATE, AND LIQUID CRYSTAL DISPLAY

CROSS-REFERENCE TO RELATED APPLICATIONS

This application claims priority from Japanese Patent Application No. 2008-229792 filed on Sep. 8, 2008 the entire contents of which are hereby incorporated by reference.

BACKGROUND OF THE INVENTION

1. Field of the Invention

The present invention relates to methods of manufacturing light diffusion film, a light diffusion film, a polarizing plate, and a liquid crystal display.

2. Description of the Related Art

Recently, liquid crystal displays (LCDs) are used widely in, for example, PCs, automated teller machines (ATMs), and car navigation system equipment. Among LCDs, in a transmissive LCD with a twisted nematic (TN) mode employed therein, for example, viewing angle dependency is high, picture quality changes considerably when it is viewed from an oblique direction at a certain angle or more, and an image to be displayed in black under normal conditions appears whitish, and thus the contrast ratio may decrease or tone reversal may cause difficulty in viewing normal display. Therefore, a method has been proposed in which a light diffusion film is disposed on a front surface of a device for the purpose of securing the viewing angle of a LCD (for example, see JP 10 (1998)-10513 A). According to this proposal, the tone reversal is suppressed and the viewing angle increases but there is a problem in that the contrast in the front direction decreases. Therefore, a light scattering film has been proposed that adjusts inner refractive-index distribution in order to cancel the decrease in image quality while balancing a tone reversal prevention effect with contrast maintenance (for example, see JP2006-133463 A and JP2007-271673 A). Such light scattering film is obtained by forming interference fringes derived from an original light diffusion film inside of a resin film by irradiating light excellent in coherent such as a laser beam onto a resin film made of photosensitive resins having different refractive index through the original light scattering film. Since the interference fringes formed in this manner show properties of the original light diffusion film, the resin film thus obtained is a light diffusion film. According to this method, a resin film having various light diffusion properties can be obtained by controlling the light diffusion properties of the original light diffusion film.

However, as schematically shown in FIG. 2, a laser beam that has been incident from the side of an original light diffusion film 13 is reflected at an interface between air and a light transmissive substrate 21 that is formed on the other side of a photosensitive resin layer 12. The incident laser beam (O-order light 14, diffusion light (primary light) 15) may be interfered with specular reflection light 26 at the rear surface, and thereby a reflection hologram may be formed. A schematic view of an example of a transmission hologram structure, in which interference fringes derived from an original light diffusion film are formed inside of a resin film, is shown in FIG. 4. A schematic view of an example of a reflection hologram structure formed by interference between incident light and specular reflection light at the rear surface is shown in FIG. 5. In a transmission hologram structure 40 shown in FIG. 5, low refractive index resin layers 41 and high refractive index resin layers 42 are alternately arranged along a laser beam incident direction (a direction of an arrow). A reflection hologram is formed by interference between an incident laser beam and specular reflection light. Therefore, as shown in FIG. 5, a reflection hologram structure 50, in which the low refractive index resin layers 41 and the high refractive index resin layers 42 are alternately arranged along a direction different from (for example, perpendicular to) the laser beam incident direction (the direction of the arrow), is formed. When the reflection hologram structure as shown in FIG. 5 is formed, in a case where the laser beam is visible light, this reflection hologram may cause a phenomenon in which a light diffusion film exhibits color. Therefore, when a light diffusion film is used in a liquid crystal display or the like, although an improved viewing angle is obtained, display properties may be deteriorated because of color due to a reflection hologram.

SUMMARY OF THE INVENTION

The present invention is intended to provide a method of easily manufacturing a light diffusion film by a continuous process, which achieves both good display properties and an increase in viewing angle with a good contrast ratio over a wide viewing angle when used in a liquid crystal display. Furthermore, the present invention also is intended to provide a light diffusion film in which formation of a reflection hologram is suppressed, a polarizing plate, and a liquid crystal display.

In order to achieve the aforementioned object, the method of manufacturing a light diffusion film of the present invention includes: forming a laminate of an original light diffusion film and a photosensitive resin, wherein the photosensitive resin includes at least two types of materials that are different in refractive index from each other; and irradiating the laminate with a collimated laser beam from a side of the original light diffusion film, wherein a reflection hologram formation-preventing layer is located on a side of the laminate opposite from the side of irradiation of the laminate with a collimated laser beam and wherein in the process of irradiating the laminate the reflection hologram formation-preventing layer prevents formation of a reflection hologram on the photosensitive resin due to a reflected light from the irradiation.

The light diffusion film of the present invention may be manufactured by the method of manufacturing a light diffusion film of the present invention.

The polarizing plate of the present invention includes a polarizer and a protective layer that are stacked together, wherein the protective layer is the aforementioned light diffusion film of the present invention.

The liquid crystal display of the present invention may include a light diffusion film, wherein the light diffusion film is the aforementioned light diffusion film of the present invention.

The liquid crystal display of the present invention may include a polarizing plate, wherein the polarizing plate is the aforementioned polarizing plate of the present invention.

The method of manufacturing a light diffusion film of the present invention makes it possible to easily manufacture a light diffusion film by a continuous process, in which formation of a reflection hologram is suppressed. As a result, for example, in a case where the light diffusion film obtained by the method of manufacturing of the present invention is used in a liquid crystal display, both good display properties and an increase in viewing angle with a good contrast ratio over a wide viewing angle are achieved. Further, use of the light diffusion film of the present invention makes it possible to provide a polarizing plate and a liquid crystal display, which have the aforementioned properties.

DETAILED DESCRIPTION OF THE INVENTION

Figure 1:
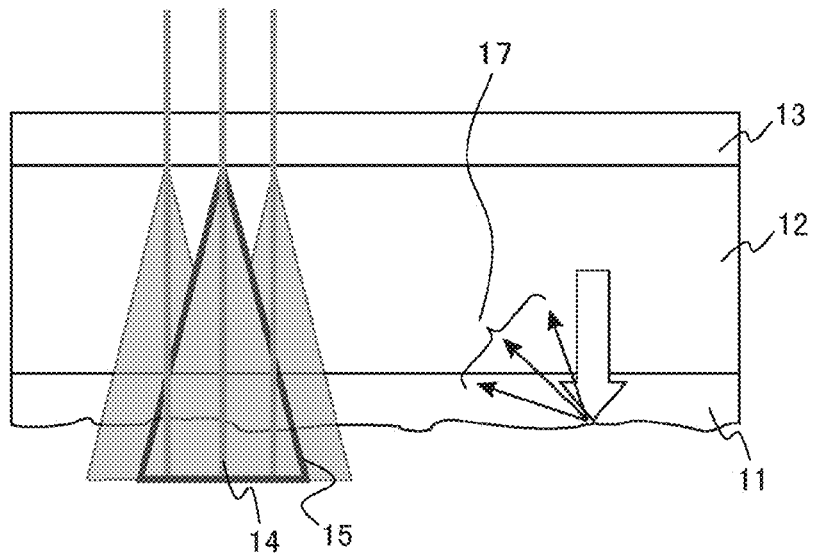
FIG. 1 is a conceptual diagram showing a method of manufacturing a light diffusion film of the present invention.
Figure 2:
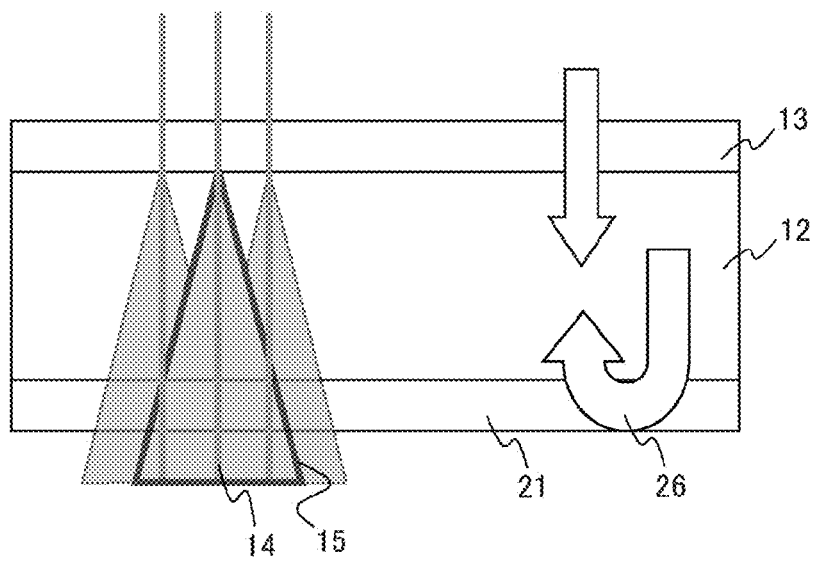
FIG. 2 is a conceptual diagram showing a method of manufacturing a light diffusion film according to a related art.

In the method of manufacturing a light diffusion film of the present invention, it is preferable that the reflection hologram formation-preventing layer has an unevenness on a surface thereof.

In the method of manufacturing a light diffusion film of the present invention, it is preferable that the reflection hologram formation-preventing layer is made with an antireflection treatment on a surface thereof.

In the method of manufacturing a light diffusion film of the present invention, it is preferable that the reflection hologram formation-preventing layer includes a laser beam absorbing layer.

In the method of manufacturing a light diffusion film of the present invention, it is preferable that the laser beam is irradiated at a predetermined angle with respect to a normal line of the surface of the laminate in the process of irradiating.

In the method of manufacturing a light diffusion film of the present invention, it is preferable that the original light diffusion film is at least one selected from the group consisting of a surface hologram, a volume hologram, a diffraction grating, a surface uneven film, a light diffusion film containing particles, and a surface uneven film containing particles.

In the light diffusion film of the present invention, it is preferable that the reflection hologram formation-preventing layer is an antiglare layer.

In the light diffusion film of the present invention, it is preferable that the surface of the light diffusion film is applied with an antireflection treatment.

In the light diffusion film of the present invention, the light diffusion film may be a directional light diffusion film having incident angle dependence. In the present invention, the term "directional light diffusion" indicates a diffusion state where the diffusion properties of outgoing light vary depending on the incident direction and refers to the properties that diffusion occurs with respect to light incident from a particular direction.

In the polarizing plate of the present invention, it is preferable that the protective layer is stacked on two surfaces of the polarizer and at least one of the protective layers is the light diffusion film of the present invention.

In the method of manufacturing a light diffusion film of the present invention, it is preferable that a layer having the photosensitive resin itself comprises the reflection hologram formation-preventing layer.

In the method of manufacturing a light diffusion film of the present invention, it is preferable that a layer having the photosensitive resin itself has an unevenness on a surface thereof.

Next, the present invention is described in detail. However, the present invention is not limited by the following descriptions.

The method of manufacturing a light diffusion film of the present invention includes: forming a laminate of an original light diffusion film and a photosensitive resin, wherein the photosensitive resin includes at least two types of materials that are different in refractive index from each other; and irradiating the laminate with a collimated laser beam from a side of the original light diffusion film, wherein a reflection hologram formation-preventing layer is located on a side of the laminate opposite from the side of irradiation of the laminate with a collimated laser beam. In the process of irradiating the laminate, the reflection hologram formation-preventing layer prevents formation of a reflection hologram on the photosensitive resin due to a reflected light from the irradiation.

The reflection hologram formation-preventing layer is formed at the other side of the original light diffusion film of the laminate for the following purpose. That is, when a laser beam that has been incident from the side of the original light diffusion film is reflected and specular reflection occurs at an interface between the laminate and air, due to interference between the specular reflection light and the incident laser beam, a reflection hologram, interference fringes not derived from the original light diffusion film, is formed inside of the light diffusion film. When such light diffusion film is applied to a screen of a liquid crystal display, although an improved viewing angle is obtained, the screen may be colored due to a reflection hologram. This is not preferable as a display property for a liquid crystal display. In the manufacturing process, in order to prevent formation of the reflection hologram, it is effective to prevent specular reflection at the interface between the laminate and air. Therefore, in the present invention, the reflection hologram formation-preventing layer is formed at the other side of the original light diffusion film of the laminate, which is the interface side.

Figure 3:
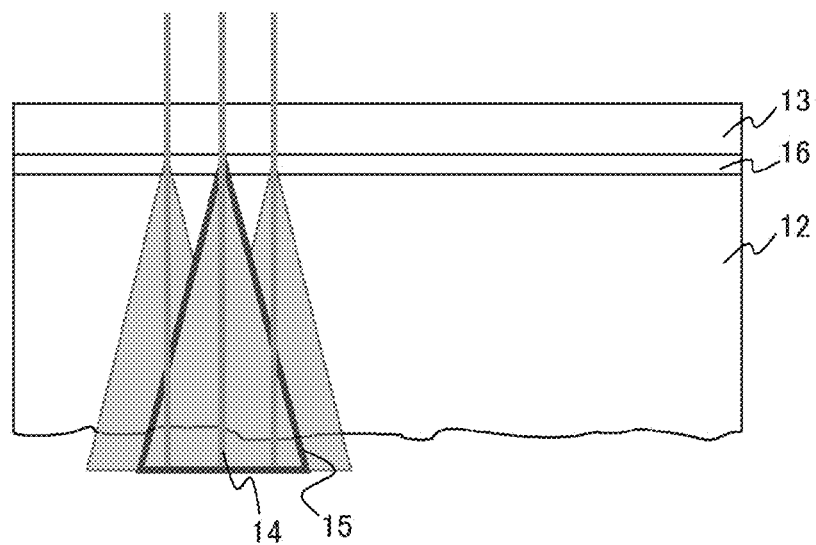
FIG. 3 is another conceptual diagram showing a method of manufacturing a light diffusion film of the present invention.
Figure 4:
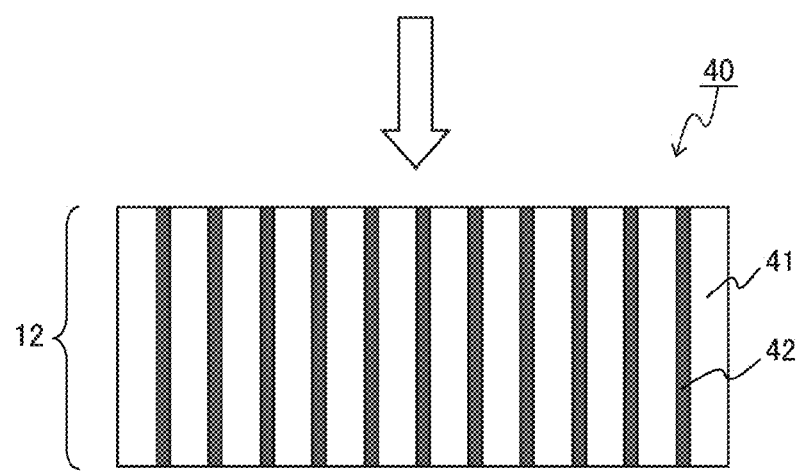
FIG. 4 is a schematic view of a transmission hologram structure.
Figure 5:
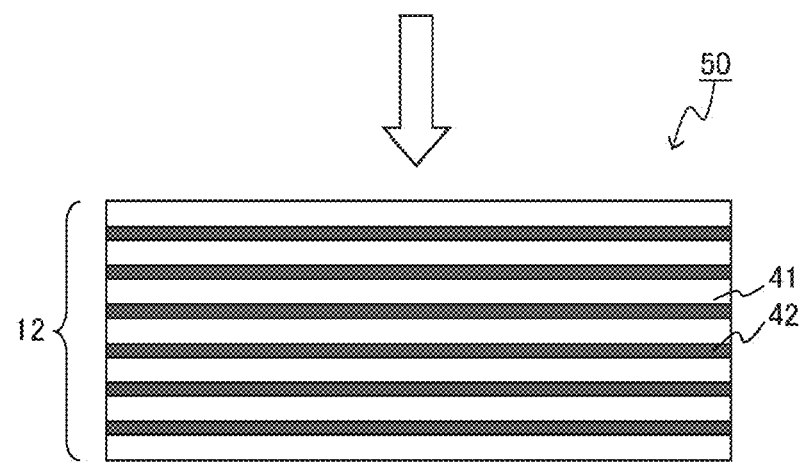
FIG. 5 is a schematic view of a reflection hologram structure.

The method of manufacturing a light diffusion film of the present invention is shown in a conceptual diagram of FIG. 1. As an embodiment of the method of manufacturing a light diffusion film of the present invention, the photosensitive resin is applied to an original light diffusion film 13 to form a laminate with a photosensitive resin layer 12, a reflection hologram formation-preventing layer 11 is formed on the photosensitive resin layer 12 of the laminate, and then the laminate is irradiated with a laser beam from the side of the original light diffusion film 13. However, the present invention is not limited thereto. The reflection hologram formation-preventing layer 11 is applicable as long as it prevents specular reflection of laser beams 14 and 15 and prevents formation of a hologram due to interference between specular reflection light and an incident laser beam. A layer having unevenness on the surface thereof, a layer having a light diffusion effect, the haze value thereof is within a predetermined range, or a laser beam-absorbing layer can be used as the reflection hologram formation-preventing layer. For example, when a film having unevenness on the surface thereof as shown in FIG. 1 is used as the reflection hologram formation-preventing layer 11, by making reflected light at the rear surface as diffusion reflection light 17, interference with the incident laser beams 14 and 15 can be suppressed. From the viewpoints of preventing interference with the incident laser beam, it is preferable that the amount of the diffusion reflection light 17 incident to the photosensitive resin layer 12 is small. Further, as shown in FIG. 3, a photosensitive resin layer 12, which has unevenness on the surface thereof, of the laminate may serve as the reflection hologram formation-preventing layer. When a film reflection hologram formation-preventing layer is used, the original light diffusion film 13 may be stacked on the reflection hologram formation-preventing layer 11 applied with the photosensitive resin. The original light diffusion film 13 may directly be stacked on the photosensitive resin layer 12 or the original light diffusion film 13 may be stacked on the photosensitive resin layer 12 through a transparent film 16, for example. As described above, the process of irradiating in this state makes it possible to prevent formation of the reflection hologram in the photosensitive resin layer.

In the process of forming the laminate, for example, after applying photosensitive resin to one of the surface of a lengthy reflection hologram formation-preventing layer, the photosensitive resin is dried. The method of applying the photosensitive resin is not particularly limited and conventionally known various methods can be employed. Examples of the method of forming the photosensitive resin layer include a spin coating method, a roll coating method, a flow coating method, a printing method, a dip coating method, a casting film forming method, a bar coating method, and a gravure printing method. Furthermore, it also can be formed by an easy method in which the photosensitive resin is sandwiched between the reflection hologram formation-preventing layer and the original diffusion film. The amount of the photosensitive resin to be applied can suitably be set. Further, the method of drying is not particularly limited and conventionally known various methods can be employed. For example, the photosensitive resin is dried at an arbitrary temperature within 50° C. to 130° C. for 1 to 10 minutes.

For example, the thickness of the photosensitive resin layer is preferably in the range of 5 μm to 100 μm and more preferably in the range of 10 μm to 45 μm, although it can be set suitably according to performance such as the difference in refractive index of materials of the photosensitive resin. Setting of the thickness of the photosensitive resin layer in the aforementioned range makes it possible to obtain a light diffusion film having good light diffusion properties.

Next, a laminate is formed by closely applying a lengthy original light diffusion film to the photosensitive resin layer. Use of the lengthy original light diffusion film makes it possible to manufacture a light diffusion film continuously and seamlessly in the present invention. The original light diffusion film is preferably applied through an adhesive layer. The adhesive layer includes a pressure sensitive adhesive layer made of a pressure sensitive adhesive. The method of applying is not particularly limited. For example, the reflection hologram formation-preventing layer, the photosensitive resin layer, and the original light diffusion film are stacked in order between a pair of application rollers, and are laminated by applying pressure thereto in the thickness direction. This lamination makes it possible to prevent air bubbles from occurring between the original light diffusion film and the adhesive layer, and thereby a light diffusion film with good appearance can be obtained. The pressure to be applied at the time of pressure bonding is preferably in the range of 0.01 N/mm$^2$ to 1 N/mm$^2$. It is preferable to perform an autoclave treatment after a lamination treatment because fine particles are removed. In this process, it is also preferable to laminate a transparent film on the photosensitive resin layer and then to bond the transparent film and the original light diffusion film with a pressure sensitive adhesive. In this case, the original light diffusion film can easily be removed after the process of irradiating and the light diffusion film after removal can easily be reintroduced into the process of forming the laminate.

An adhesive or a pressure sensitive adhesive used for the adhesive layer are not particularly limited. For example, the adhesive or the pressure sensitive adhesive, in which polymer such as acrylic polymer; silicone polymer; polyester; polyurethane; polyamide; polyvinyl ether; vinyl acetate/vinyl chloride copolymer; modified polyolefin; epoxy polymer; fluorine polymer; or rubber polymer such as natural rubber, synthetic rubber, or the like is used as base polymer, can be suitably selected for use. Particularly, an acrylic-based pressure sensitive adhesive is preferably used in that it is excellent in optical transparency, shows adhesion properties such as appropriate wettability, aggregability, and adhesiveness, and is excellent in weather resistance and heat resistance.

The adhesive or the pressure sensitive adhesive may contain a crosslinking agent according to the base polymer thereof. Further, when an adhesive layer is made of a pressure sensitive adhesive, a suitable additive may be added to the pressure sensitive adhesive as required. Examples of the additive include resins such as a natural product and a synthetic product, a glass fiber and a glass bead, a bulking agent and a pigment composed of metallic powder and other inorganic powder, a coloring agent, an antioxidizing agent, and the like. Further, an adhesive layer showing light diffusion properties can be used by containing transparent fine particles in the pressure sensitive adhesive.

Examples of the fine particles include conductive inorganic fine particles with an average particle diameter of 0.01 μm to 20 μm such as silica, calcium oxide, alumina, titania, zirconia, tin oxide, indium oxide, cadmium oxide, or antimony oxide; or crosslinking or uncrosslinking organic fine particles with an average particle diameter of 0.01 μm to 20 μm composed of suitable polymer such as polymethylmethacrylate or polyurethane. One of the inorganic particles or organic particles may be used or two or more of them may be used.

The adhesive or the pressure sensitive adhesive is normally used in a form of an adhesive solution, in which base polymer or its composition is dissolved or dispersed in a solvent, with a solid content concentration of 10 wt % to 50 wt %. As the solvent, an organic solvent such as toluene or ethyl acetate or the like or water can be used suitably according to types of the adhesive. In a case of the pressure sensitive adhesive, the film thickness of the adhesive layer can be set suitably according to purposes and adhesive power. For example, the film thickness is preferably in the range of 1 μm to 100 μm, more preferably in the range of 2 μm to 50 μm, and particularly preferably in the range of 3 μm to 30 μm.

Application of various surface treatments on the surface of the original light diffusion film or the reflection hologram formation-preventing layer makes it possible to increase adhesiveness with the photosensitive resin layer. As the surface treatment, conventionally known methods can be employed. Examples of the surface treatment include a low-pressure plasma treatment, an ultraviolet irradiation treatment, a corona treatment, a flame treatment, an acid or an alkali treatment, and the like. Further, when triacetylcellulose (TAC) is used as the material of the original light diffusion film or the reflection hologram formation-preventing layer, it is preferable to apply an alkali saponification treatment to the surface of the original light diffusion film or the reflection hologram formation-preventing layer. Preferably, the alkali saponification treatment may be performed in a cycle in which the surface of the original light diffusion film or the reflection hologram formation-preventing layer is washed with water and dried after immersing in an alkali solution. Examples of the alkali solution include a potassium hydroxide solution, a sodium hydroxide solution, and the like. Further, a normal concentration of hydroxide ion in the alkali solution is preferably in the range of 0.1 N to 3.0 N (mol/L) and more preferably in the range of 0.5 N to 2.0 N (mol/L). A temperature of the alkali solution is preferably in the range of 25° C. to 90° C. and more preferably in the range of 40° C. to 70° C. Thereafter, a washing treatment and a drying treatment are performed, and thereby TAC applied with the surface treatment can be obtained.

Subsequently, the photosensitive resin layer is irradiated with the laser beam from the side of the original light diffusion film, and thereby a diffusion film is formed by recording light diffusion information. At this time, irradiation of the laser beam can be performed by continuously running the laminate or by a batched processing in which a certain area of the laminate is wholly irradiated with the laser beam. Specifically, since the photosensitive resin layer runs together with the original light diffusion film having isotropy, light diffusion properties (light diffusion information) recorded on the photosensitive resin layer do not have aeolotropy. As a result, the light diffusion properties can arbitrarily be controlled. Irradiation of the laser beam may be performed with respect to a predetermined irradiation area and the laminate runs within the irradiation area. The method of irradiating the laser beam is not particularly limited. For example, irradiation may be performed by changing the laser beam irradiated from the light source into parallel (collimated) light using a conventionally known lens. Further, although irradiation may be performed continuously in accordance with a transferring condition of the laminate, intermittent irradiation considering running speed also may be applicable.

The irradiation of the laser beam is preferably performed at a predetermined angle with respect to a normal line of the surface of the laminate (irradiation surface). In accordance with an angle of the laser beam irradiating to the surface of the laminate, directional diffusion properties may be applied to the obtained light diffusion film. The angle of the irradiation may be set suitably according to properties of the original light diffusion film and use of the light diffusion film. The angle of the irradiation is preferably in the range of 0° to 80° and more preferably in the range of 0° to 70° with respect to the normal line of the surface of the laminate.

The collimated laser beam with which the laminate is irradiated needs to contain a wavelength that can polymerize and cure the photosensitive resin. When the aforementioned light diffusion film is to be formed using a Nd:YAG laser (SHG: 532 nm), the light intensity is preferably in the range of 0.01 mW/cm$^2$ to 1000 mW/cm$^2$. When the light intensity is 0.01 mW/cm$^2$ or more, it does not take a long time to cure and therefore the production efficiency may be enhanced. When it exceeds 1000 mW/cm$^2$, the photosensitive resin is cured too quickly to obtain structure formation, and thereby desired light diffusion properties may not be able to be exhibited. Therefore, it is preferable that the light intensity is 1000 mW/cm$^2$ or lower. The light intensity is more preferably in the range of 0.1 mW/cm$^2$ to 100 mW/cm$^2$. In place of the above-mentioned Nd:YAG laser, a Nd:YVO$_4$ laser (532 nm), an argon ion laser (488 nm), a Nd:YAG laser (THG: 355 nm), a LED light source (405 nm), or a g-ray (436 nm) also can be used by selecting the polymerization initiator for the photosensitive resin. Further, with respect to the laser beam, the coherent length is preferably shorter. When the coherent length is short, interference between the incident laser beam and the laser beam, which is reflected at the rear surface of the reflection hologram formation-preventing layer, hardly occurs. When the coherent length is less than twice the thickness of the reflection hologram formation-preventing layer, interference does not occur and formation of the reflection hologram is suppressed. Although the type of the laser is not limited, the coherent length varies depending on manufacturer.

Continuous running of the laminate can be performed by using a pair of rewinding roll and winding roll, for example. Further, by maintaining a regular rotational speed of the rewinding roll and the winding roll, the laminate can be transferred in a predetermined direction at a certain speed. The rewinding roll and the winding roll are arranged at both sides of the irradiation surface with the laser beam. The transferring speed of the laminate is preferably in the range of 1 m/min to 100 m/min and more preferably in the range of 2 m/min to 50 m/min. When the transferring speed is within the aforementioned range, productivity can be improved.

The photosensitive resin to be used is made of at least two types of materials that are different in refractive index from each other. Monomers with a plurality of types of photosensitivities that are different in refractive index from one another may be mixed together for use. A photopolymerization initiator may be mixed into the photosensitive resin. For the monomers, it also is possible to use, for example, commercial photocurable monomers. Furthermore, the use of photocurable hologram recording materials also is preferable. Examples of the hologram recording materials include OPTOREM (trade name; registered trademark) manufactured by Nippon Paint Co., Ltd., OMNIDEX (trade name) manufactured by Du Pont Kabushiki Kaisha, and hologram recording materials manufactured by Daiso Co., Ltd. OPTOREM (registered trademark) is a hybrid photocurable photopolymer material that utilizes photoradical polymerization and photocation polymerization in combination.

The photosensitive resin contains materials that are different in refractive index from each other. The difference in the refractive index is preferably more than 0.01 and more preferably more than 0.02. The respective materials that are different in refractive index from each other may be cured under different curing conditions. When all the materials that are different in refractive index are resins that are cured through photopolymerization, it is preferable that they are different in, for example, curing rate or wavelength range in which photopolymerization starts.

Examples of the applicable photopolymerization initiator include 2,2-dimethoxy-2-phenylacetophenone, acetophenone, benzophenone, xanthone, 3-methylacetophenone, 4-chlorobenzophenone, 4,4'-dimethoxybenzophenone, benzoin propyl ether, benzyl dimethyl ketal, N, N,N',N'-tetramethyl-4,4'-diaminobenzophenone, 1-(4-isopropylphenyl)-2-hydroxy-2-methylpropane-1-one, and other thioxanthone compounds.

The photosensitive resin further may contain any suitable additives. Examples of the additives include a surfactant, a plasticizer, a heat stabilizer, a light stabilizer, a lubricant, an antioxidant, an ultraviolet absorbing agent, a flame retardant, a colorant, an antistatic agent, a cross-linking agent, a thickener, and metals.

The surfactant is blended for the purpose of, for example, forming a smooth surface when the photosensitive resin is spread over the original light diffusion film or the reflection hologram formation-preventing layer to form a photosensitive resin layer. Examples of the surfactant include a silicone surfactant, an acrylic surfactant, and a fluorochemical surfactant.

In this state, when the photosensitive resin layer is the one that contains at least a radical polymerizable compound having higher relative refractive index and a cationic polymerizable compound having lower relative refractive index, preferably, after irradiating the photosensitive resin layer with the laser beam, the photosensitive resin layer is heated and further irradiated with ultraviolet radiation. An initial pattern of the light diffusion properties can be recorded on the photosensitive resin layer by the radical reaction of the radical polymerizable compound by irradiating a predetermined recording area of the photosensitive resin layer with the laser beam. However, in a condition where the initial pattern is merely recorded on the photosensitive resin layer, function of the light diffusion properties is insufficient. By heating the whole area of the photosensitive resin layer in this state, mass transfer of the radical polymerizable compound and the cationic polymerizable compound, which configure the photosensitive resin layer, is performed to separate them, and thereby the pattern can be clarified. Further, by irradiating the whole area of the photosensitive resin layer with ultraviolet radiation, the cationic reaction of the cationic polymerizable compound is performed as well as the radical reaction of the unreacted radical polymerizable compound is performed. Thereby, a recorded layer, to which predetermined light diffusion properties are recorded, can be formed. The process of heating and the process of irradiating with ultraviolet radiation may be performed with respect to the aforementioned laminate or the laminate after irradiation with the laser beam from which the original diffusion film is removed.

The heating temperature with respect to the photosensitive resin layer is preferably in the range of 40° C. to 140° C., and more preferably in the range of 60° C. to 120° C. Further, the heating time is preferably in the range of 1 to 120 minutes, and more preferably in the range of 5 to 60 minutes. When the heating temperature is less than 40° C. and the heating time is less than 1 minute, the phase separation of the radical polymerizable compound and the cationic polymerizable compound may be insufficient. Further, when the heating temperature is higher than 140° C. and the heating time exceeds 120 minutes, the photosensitive resin layer and the original light diffusion film may be dissolved.

As an irradiation condition of the ultraviolet radiation with respect to the photosensitive resin layer, for example, the irradiation amount is preferably in the range of 0.1 J/cm$^2$ to 10 J/cm$^2$. When the irradiation amount is less than 0.1 J/cm$^2$, the cationic reaction of the cationic polymerizable compound may be insufficient. Further, when the irradiation amount exceeds 10 J/cm$^2$, the formed light diffusion film may be colored. In addition, when the laminate is irradiated with ultraviolet radiation, the original light diffusion film and the reflection hologram formation-preventing layer may also be colored.

In the method of manufacturing a light diffusion film of the present invention, it is preferable that at least one selected from the group consisting of a surface hologram, a volume hologram, a diffraction grating, a surface uneven film, a light diffusion film containing particles such as inorganic particles or organic particles, and a surface uneven film containing particles such as inorganic particles or organic particles is used as the original light diffusion film. The surface hologram is not particularly limited and a conventionally known surface hologram may be used. Examples of the surface hologram include a phase modulated hologram, an amplitude modulated hologram, and the like. In the phase modulated hologram, unevenness is formed on a surface layer of a transparent substrate serving as a hologram substrate, and the ratio between 0-order diffracted light and primary diffracted light is controlled by level difference of unevenness. In the amplitude modulated hologram, a lens pattern composed of periodical slits having a light blocking portion and a light transmitting portion is formed with a metallic thin film pattern on the surface of the hologram substrate to generate diffracted light. The volume hologram is not particularly limited and a conventionally known volume hologram may be used. For example, a volume hologram made of the aforementioned various surface holograms can be used. The diffraction grating is not particularly limited and a conventionally known diffraction grating can be used. The surface uneven film is not particularly limited. For example, the surface uneven film can be the one obtained by forming a fine unevenness structure on the surface of the film by preliminarily roughening a film or the surface of the resin layer formed on the film with suitable methods such as a sandblasting, an emboss rolling, a chemical etching, and the like. The surface uneven film containing particles is not particularly limited. For example, a light diffusion film containing the particles that has an unevenness structure on the surface thereof can be used.

With respect to the original light diffusion film, the half-value width is preferably in the range of 1° to 90°, and more preferably in the range of 10° to 60°. In this state, the half-value width is a diffusion angle at which intensity of outgoing diffusion light is 50% of the peak intensity. By stacking the photosensitive resin layer on the original light diffusion film and irradiating with collimated light from the side of the original light diffusion film, optical information of the used original light diffusion film can be recorded on the photosensitive resin layer.

In the present invention, a process for removing the original light diffusion film from the photosensitive resin layer may also be performed. In this case, it is preferable that an easy-removing treatment is applied to the surface of the original light diffusion film to which the photosensitive resin layer is stacked. As the easy-removing treatment, conventionally known treatments can suitably be used. For example, the surface of the original light diffusion film is coated with a suitable easy-removing agent such as a silicone agent, a long-chain alkyl agent, a fluorine agent, a molybdenum sulfide agent, or the like.

As described above, the layer having unevenness on the surface thereof can suitably be used as the reflection hologram formation-preventing layer. The layer having unevenness on the surface thereof can control reflection of the incident laser beam to the side of the laminate, and can suppress formation of a reflection hologram in the process of manufacturing a light diffusion film. Further, in a condition where the layer having unevenness is provided on the surface of the obtained light diffusion film, when the layer having unevenness becomes the outermost layer, it functions as an antiglare layer that diffuses outside light and is preferable. When the reflection hologram formation-preventing layer is the antiglare layer, the reflection hologram formation-preventing layer used in the method of manufacturing can directly be used as the antiglare layer, and productivity is thereby improved by reducing the number of processes. Accordingly, a light diffusion film having an antiglare function can be provided at low cost.

The layer having unevenness may separately be provided on the laminate at the side of the photosensitive resin layer. Alternatively, the surface itself of the photosensitive resin layer may have unevenness by embossing the surface of the photosensitive resin layer. With respect to the unevenness, Sm (mm) is preferably in the range of 0.001 to 1 and Ra (μm) is preferably in the range of 0.01 to 10. In this state, the Sm is an average interval (mm) of the surface measured according to JIS B 0601 (1994 version), and is more preferably in the range of 0.05 to 0.5. The Ra is an arithmetic average surface roughness (μm) defined by JIS B 0601 (1994 version) and is more preferably in the range of 0.05 to 5.

When the layer having unevenness is separately provided on the laminate at the side of the photosensitive resin layer, an antiglare film having an antiglare layer at least one surface of a transparent plastic film substrate can be used as the layer having unevenness.

Although it is not particularly limited, a transparent plastic film substrate is preferable since one having excellent transmittance of visible light (preferably a light transmittance of at least 90%) and good transparent (preferably a haze value of 1% or lower) tends not to affect the laminate by diffuse reflection or heat generated by irradiation light. Examples of the material for forming the transparent plastic film substrate include polyester type polymers such as polyethylene terephthalate (PET) and polyethylene naphthalate, cellulose type polymers such as diacetyl cellulose and TAC, polycarbonate type polymers, and acrylic type polymers such as polymethylmethacrylate. Examples of the material for forming the transparent plastic film substrate also include styrene type polymers such as polystyrene and an acrylonitrile-styrene copolymer, olefin type polymers such as polyethylene, polypropylene, polyolefin that has a cyclic or norbornene structure, and an ethylene-propylene copolymer, vinyl chloride type polymers, and amide type polymers such as nylon and aromatic polyamide. Furthermore, examples of the material for forming the transparent plastic film substrate also include imide type polymers, sulfone type polymers, polyether sulfone type polymers, polyether-ether ketone type polymers, polyphenylene sulfide type polymers, vinyl alcohol type polymers, vinylidene chloride type polymers, vinyl butyral type polymers, allylate type polymers, polyoxymethylene type polymers, epoxy type polymers, and blends of the above-mentioned polymers. Among these, the one having optically lower birefringence is preferably used.

The thickness of the transparent plastic film substrate is not particularly limited. For example, the thickness is preferably in the range of 10 µm to 500 µm, more preferably in the range of 20 µm to 300 µm, and most suitably in the range of 30 µm to 200 µm, with consideration given to strength, workability such as handling properties, and thin layer properties. The refractive index of the transparent plastic film substrate is not particularly limited. The refractive index is, for example, in the range of 1.30 to 1.80 and preferably in the range of 1.40 to 1.70. In the laser beam irradiation step, the difference in refractive index between the film substrate and the photosensitive resin layer is preferably 0.2 or less and more preferably 0.1 or less so that the effect of reflection at the interface between the transparent plastic film substrate and the photosensitive resin layer is reduced as much as possible.

The antiglare layer is formed by using the material for forming the antiglare layer. Examples of the material for forming the antiglare layer include thermosetting resin and ionizing radiation curable resin, which is cured by ultraviolet radiation and light. Among these, an ultraviolet curable resin that allows an antiglare layer to be formed efficiently by a simple processing operation, namely a curing treatment using ultraviolet irradiation, is preferably used. In this case, an ultraviolet polymerization initiator (photopolymerization initiator) is mixed into the ultraviolet curable resin.

Examples of the ultraviolet curable resin include those of various types such as a polyester type, acrylic type, urethane type, silicone type, and epoxy type. Examples of the ultraviolet curable resin include ultraviolet curable monomers, oligomers, and polymers. Preferable examples of the ultraviolet curable resin include those each having an ultraviolet polymerizable functional group, particularly, those containing acrylic type monomers or oligomers having at least two of the functional groups, particularly, three to six of them.

Examples of such an ultraviolet curable resin include acrylate resin of, for example, acrylic ester of polyhydric alcohol, methacrylate resin of, for example, methacrylic ester of polyhydric alcohol, polyfunctional urethane acrylate resin that is synthesized from diisocyanate, polyhydric alcohol, and hydroxyalkyl ester of acrylic acid, and polyfunctional urethane methacrylate resin that is synthesized from, for example, polyhydric alcohol and hydroxy methacrylic ester of methacrylic acid. Furthermore, for example, polyether resin, polyester resin, epoxy resin, alkyd resin, spiroacetal resin, polybutadiene resin, or polythiolpolyene resin, which has an acrylate type functional group, also can be used suitably as required. Moreover, for example, melamine type resin, urethane type resin, alkyd type resin, or silicone type resin are preferably used.

Examples of the photopolymerization initiator include 2,2-dimethoxy-2-phenylacetophenone, acetophenone, benzophenone, xanthone, 3-methylacetophenone, 4-chlorobenzophenone, 4,4'-dimethoxybenzophenone, benzoin propyl ether, benzyl dimethyl ketal, N, N,N',N'-tetramethyl-4,4'-diaminobenzophenone, 1-(4-isopropylphenyl)-2-hydroxy-2-methylpropane-1-one, and other thioxanthone compounds.

One of the above-mentioned resins may be used independently or two or more of them may be used in combination. Furthermore, it also is possible to use, for example, commercial ultraviolet curable resin as the aforementioned resin.

It also is preferable that the antiglare layer contain fine particles so that the surface structure thereof is allowed to be an uneven structure to impart antiglare properties thereto. Examples of the fine particles include inorganic fine particles and organic fine particles. The inorganic fine particles are not particularly limited. Examples thereof include silicon oxide fine particles, titanium oxide fine particles, aluminum oxide fine particles, zinc oxide fine particles, tin oxide fine particles, calcium carbonate fine particles, barium sulfate fine particles, talc fine particles, kaolin fine particles, and calcium sulfate fine particles. The organic fine particles also are not particularly limited. Examples thereof include polymethyl methacrylate resin powder (PMMA fine particles), silicone resin powder, polystyrene resin powder, polycarbonate resin powder, acrylic-styrene resin powder, benzoguanamine resin powder, melamine resin powder, polyolefin resin powder, polyester resin powder, polyamide resin powder, polyimide resin powder, and polyethylene fluoride resin powder. With respect to these inorganic fine particles and organic fine particles, one of them may be used independently or two or more of them may be used in combination.

The weight average particle size of the fine particles is preferably in the range of 30% to 75% of the film thickness of the antiglare layer and more preferably in the range of 30% to 50%. When the weight average particle size of the fine particles is 30% or more, a sufficiently uneven shape can be formed at the surface of the antiglare layer and thereby can impart a sufficient antiglare function thereto. On the other hand, when the weight average particle size of the fine particles is 75% or less, a suitable difference between convexities and concavities at the surface can be obtained, therefore a good appearance can be obtained, and further reflected light can be scattered suitably.

The shape of each fine particle is not particularly limited. For example, the shape can be a bead-like, substantially spherical shape or can be an indeterminate shape like powder. The weight average particle size of the fine particles is, for example, in the range of 1 µm to 30 µm and preferably in the range of 2 µm to 20 µm. The fine particles each have preferably a substantially spherical shape and more preferably a substantially spherical shape with an aspect ratio of 1.5 or lower.

The ratio of the fine particles to be added is not particularly limited and can be set suitably. The ratio of the fine particles to be added is, for example, in the range of 2 to 70 parts by weight, preferably in the range of 4 to 50 parts by weight, and more preferably in the range of 15 to 40 parts by weight, per 100 parts by weight of the entire resin components.

From the viewpoints of, for example, preventing interference fringes or light scatter from occurring at the interface between the fine particles and the material for forming the antiglare layer, it is preferable that the difference in refractive index between the fine particles and the material for the antiglare layer be reduced. Preferably, the difference in refractive index between the fine particles and the material for the antiglare layer is less than 0.05.

For example, the material for the antiglare layer can adjust refractive index of the antiglare layer by containing fine particles whose weight average particle sizes are less than 50 nm From viewpoints of preventing interfering light from occurring at an interface between the transparent plastic substrate and the antiglare layer, for example, the difference in refractive index between the transparent plastic substrate and the antiglare layer is preferably small. The interfering light causes a phenomenon in which reflected light of the outside light that has been incident on the antiglare film exhibits rainbow hue. Recently, three-wavelength fluorescent lamps with excellent clarity are used frequently in, for example, offices and interference fringes appear conspicuously under the three-wavelength fluorescent lamps. From these points, for example, when the materials for forming the antiglare layer are prepared, it is preferable to adjust components and amounts of the fine particles so that the difference in refractive index becomes small.

The difference in refractive index between the transparent plastic film substrate and the antiglare layer is preferably 0.04 or less and more preferably 0.02 or less. For example, when a PET film (with a refractive index of about 1.64) is used as the transparent plastic film substrate, using titanium oxide as the fine particles and by adding about 30 wt % to 40 wt % of them with respect to the total amount of the resin component of the material for forming the antiglare layer, the difference in refractive index can be controlled 0.02 or less and thereby occurrence of interference fringes can be suppressed. Further, for example, when a TAC film (with a refractive index of about 1.48) is used as the transparent plastic film substrate, using silicon oxide (silica) as the fine particles and by adding about 35 wt % to 45 wt % of them with respect to the total amount of the component of the material for forming the antiglare layer, the difference in refractive index can be controlled 0.02 or less and thereby interference fringes can be suppressed.

The thickness of the antiglare film is preferably in the range of 1 μm to 50 μm, and further preferably in the range of 2 μm to 25 μm. When the thickness is within the aforementioned predetermined range, desired unevenness can be formed, and transparency and mechanical strength of the antiglare film can be ensured. Further, when the thickness exceeds the aforementioned predetermined range, curling is increased and line traveling performance at the time of coating is deteriorated, and antiglare properties also are deteriorated. Moreover, when the thickness is less than the aforementioned predetermined range, variations in luminance in pixels are emphasized, which causes a visible failure (a failure due to glare), resulting in considerably deteriorated clearness when attached to a liquid crystal display. The antiglare layer may be a single layer or may have a multilayer structure with at least two layers stacked together.

In the method of manufacturing a light diffusion film of the present invention, it is preferable to use a reflection hologram formation-preventing layer, the surface thereof is applied with an antireflection treatment. The antireflection treatment can further suppress reflection of the laser beam at an interface between the reflection hologram formation-preventing layer and air. In the manufacturing of the light diffusion film, using the reflection hologram formation-preventing layer applied with the antireflection treatment, when the reflection hologram formation-preventing layer is directly used as the antiglare layer in the obtained light diffusion film, the light diffusion film includes antiglare effect as well as surface antireflection effect of the outside light, and visibility of the liquid crystal display to which the light diffusion film is used is improved, and thus is preferable.

The antireflection treatment may be applied to an interface between the photosensitive resin layer and the reflection hologram formation-preventing layer. The antireflection treatment can suppress reflection at the interface between the photosensitive resin layer and the reflection hologram formation-preventing layer at the time of irradiating with the laser beam, and is preferable.

As the reflection hologram formation-preventing layer, a layer whose haze value is within the predetermined range and having light diffusion effect can be used. With respect to the layer whose haze value is within the predetermined range and having light diffusion effect, the haze value is preferably in the range of 5% to 90%, and more preferably in the range of 10% to 80%. The haze value is a haze value (cloudiness) (%) according to JIS K 7136 (2000 version). When the haze value is within the aforementioned range, light diffusion occurs in the reflection hologram formation-preventing layer, specular reflection of the incident laser beam is suppressed, and a reflection hologram is less formed. The layer whose haze value is within the aforementioned range may be a layer having unevenness that is separately provided on the laminate at the side of the photosensitive resin layer. In that case, the layer having unevenness may have an inner haze by containing particles.

Further, as the reflection hologram formation-preventing layer, a laser beam absorbing layer can also be used. The laser beam absorbing layer can be formed by forming a black resin layer that is liable to absorb the laser beam or by applying a black film or tape. However, the color of the laser beam absorbing layer is not limited to black. The laser beam absorbing layer is applicable as long as it has an absorbing area in the vicinity of the wavelength of the irradiating laser beam. In the laser beam absorbing layer, preferably, not more than $1/100$ of the incident laser beam is reflected, and more preferably, not more than $1/500$ of the incident laser beam is reflected. When the incident laser beam is absorbed at the laser beam absorbing layer, reflection to the side of the laminate can be suppressed and formation of a reflection hologram in the process of manufacturing a light diffusion film can be suppressed. It is also preferable to form an antireflection layer between the laser beam absorbing layer and the photosensitive resin layer. The antireflection layer can suppress reflection at an interface between the laser beam absorbing layer and the photosensitive resin layer at the time of irradiating with the laser beam. In addition, after forming a light diffusion film, when the light diffusion film is used by removing the laser beam absorbing layer therefrom while remaining the antireflection layer, the obtained light diffusion film is provided with an antireflection function.

With respect to the light diffusion film of the present invention, the surface thereof is preferably applied with an antireflection treatment. The light diffusion film of the present invention may include a reflection hologram formation-preventing layer as the antiglare layer. Alternatively, the light diffusion film of the present invention may be irradiated with a laser beam in the process of manufacturing of the present invention, and the reflection hologram formation-preventing layer is removed therefrom after formation of the light diffusion film. In a case of the light diffusion film from which the reflection hologram formation-preventing layer is removed, the antireflection treatment is applied to the surface of the photosensitive resin layer from which the reflection hologram formation-preventing layer is removed. Alternatively, the reflection hologram formation-preventing layer may be stacked on the photosensitive resin layer, and the surface thereof preliminarily applied with the antireflection treatment.

It also is preferable to use an antireflection layer as the antireflection treatment. The antireflection layer may be disposed on the reflection hologram formation-preventing layer or the photosensitive resin layer. Preferably, the antireflection layer has a refractive index in the range of 1.25 to 1.45.

In the present invention, the antireflection layer may be a thin optical film whose thickness and refractive index are controlled strictly or one including two or more of the thin optical films stacked together. The antireflection layer uses the interference effect of light to cancel opposite phases of incident light and reflected light and thereby exhibits an antireflection function. In order to suppress formation of a reflection hologram more efficiently, it is preferable to design the antireflection layer such that the reflectance within the wavelength of the laser beam used for manufacturing the diffusion film is minimized. In order to exhibit the antireflection function with respect to outside light during use of the diffusion film, the wavelength range of visible light is, for example, in the range of 380 nm to 780 nm, the wavelength range in which particularly high visibility is obtained is in the range of 450 nm to 650 nm, and preferably, the antireflection layer is designed so that the reflectance at 550 nm, which is the center wavelength, is minimized.

When the antireflection layer is designed based on the effect of interference of light, the interference effect can be enhanced by, for example, a method of increasing the difference in refractive index between the antireflection layer and the reflection hologram formation-preventing layer. Generally, in an antireflection multilayer having a structure including two to five thin optical layers (each with strictly controlled thickness and refractive index) that are stacked together, components with different refractive indices from each other are used to form a plurality of layers with a predetermined thickness. Thus, the antireflection layer can be designed optically at a higher degree of freedom, the antireflection effect can be enhanced, and the spectral reflection characteristics also can be made uniform (flat) in the visible light range. Since each layer of the thin optical film must be highly precise in thickness, a dry process such as vacuum deposition, sputtering, or CVD is generally used to form each layer.

For the antireflection multilayer, one with a two-layer structure also is preferred, in which a low refractive index silicon oxide layer (with a refractive index of about 1.45) is stacked on a high refractive index titanium oxide layer (with a refractive index of about 1.8). One with a four-layer structure is more preferable, in which a silicon oxide layer is stacked on a titanium oxide layer, another titanium oxide layer is stacked on the silicon oxide layer, and then another silicon oxide layer is stacked thereon. The formation of the two- or four-layered antireflection layer can evenly reduce reflection over the visible light wavelength range (for example, in the range of 380 nm to 780 nm).

The antireflection effect also can be produced by forming a thin monolayer optical film (an antireflection layer) on the reflection hologram formation-preventing layer or the photosensitive resin layer. The antireflection monolayer is generally formed using a coating method such as a wet process, for example, fountain coating, die coating, spin coating, spray coating, gravure coating, roll coating, or bar coating.

Examples of the material for forming an antireflection monolayer include: resin materials such as ultraviolet curable acrylic resins; hybrid materials containing inorganic fine particles such as colloidal silica that are dispersed in a resin; and sol-gel materials containing metal alkoxide such as tetraethoxysilane and titanium tetraethoxide. Preferably, the material contains a fluorine group in order to impart antifouling surface properties. In terms of, for example, scratch resistance, the material preferably contains a large amount of an inorganic component, and the sol-gel materials are more preferable. The sol-gel materials can be used after being condensed partially.

A preferred antireflection layer is formed of a material containing siloxane oligomers with a number average molecular weight in terms of ethylene glycol in the range of 500 to 10000 and a fluorine compound that has a number average molecular weight in terms of polystyrene of at least 5000, and includes a fluoroalkyl structure and a polysiloxane structure (the material described in JP 2004-167827 A, incorporated herein by reference), because, for example, it can have both scratch resistance and low reflection.

The antireflection layer may contain an inorganic sol in order to increase film strength. The inorganic sol is not particularly limited and examples thereof include inorganic sols of, for example, silica, alumina, and magnesium fluoride. Particularly, silica sol is preferred. The ratio of the inorganic sol to be added is, for example, in the range of 10 to 80 parts by weight, per 100 parts by weight of the total solids of the material for forming the antireflection layer. The size of the inorganic fine particles in the inorganic sol is preferably in the range of 2 nm to 50 nm and more preferably in the range of 5 nm to 30 nm.

The material for forming the antireflection layer preferably contains hollow spherical silicon oxide ultrafine particles. The silicon oxide ultrafine particles have preferably an average particle size of around 5 nm to 300 nm and more preferably in the range of 10 nm to 200 nm. The silicon oxide ultrafine particles may be in the form of hollow spheres each including a pore-containing outer shell, inside of which a hollow is formed. The hollow may contain at least one of a solvent and a gas that has been used for preparing the silicon oxide ultrafine particles. A precursor substance for forming the hollow of the silicon oxide ultrafine particle preferably remains in the hollow. The thickness of the outer shell is preferably in the range of about 1 nm to 50 nm and in the range of approximately 1/50 to 1/5 of the average particle size of the silicon oxide ultrafine particles. Preferably, the outer shell is formed of a plurality of coating layers. In the silicon oxide ultrafine particles, it is preferable that the pores are blocked and the hollow be sealed with the outer shell. This is because the antireflection layer maintains a porous structure or a hollow of the silicon oxide ultrafine particles and therefore can have a further reduced refractive index. The method of manufacturing such hollow spherical silicon oxide ultrafine particles, which is employed suitably, is, for example, a method of manufacturing silica fine particles disclosed in JP 2001-233611 A.

The antireflection layer can be formed by suitable methods according to the material for forming the antireflection layer such as ultraviolet curing, thermosetting, and the like. The temperature for drying and curing that may be employed in forming the antireflection layer is not particularly limited and is, for example, in the range of 60° C. to 150° C. and preferably in the range of 70° C. to 130° C. The period of time for drying and curing is, for example, in the range of 1 to 30 minutes and preferably in the range of 1 to 10 minutes in view of productivity. After drying and curing, also by further performing the heat treatment, an antireflection layer can be obtained. The temperature for the heat treatment is not particularly limited and is, for example, in the range of 40° C. to 130° C. and preferably in the range of 50° C. to 100° C. The period of time for the heat treatment is not particularly limited and is, for example, 1 minute to 100 hours and more preferably at least 10 hours in terms of improving scratch resistance. The heat treatment can be performed by a method using, for example, a hot plate, an oven, or a belt furnace.

When the light diffusion film including the antireflection layer is attached to an image display, the antireflection layer may frequently serve as the outermost layer and thus is susceptible to stains from the external environment. Stains are more conspicuous on the antireflection layer than on, for example, a simple transparent plate. In the antireflection layer, for example, deposition of stains such as fingerprints, thumbmarks, sweat, and hair dressing products may change the surface reflectance, or the deposition may appear to stand out whitely to make the displayed content unclear. Preferably, an antistain layer formed of, for example, a fluoro-silane compound or a fluoro-organic compound is stacked on the antireflection layer in order to prevent deposition of stains and improve the ease of removal of the stains deposited.

Next, a polarizing plate is described that includes a light diffusion film of the present invention stacked therein. It is possible to obtain a polarizing plate with functions of the present invention by stacking the light diffusion film of the present invention on a polarizer or a polarizing plate using, for example, an adhesive or a pressure sensitive adhesive. The light diffusion film of the present invention, from which the original diffusion film is removed, may be stacked on a polarizer and thereby a polarizing plate can be obtained. Since such a structure allows the light diffusion film to be used as a protective layer of a polarizer, it does not need a protective layer formed of, for example, triacetylcellulose (TAC), which can simplify the structure of the polarizing plate. Accordingly, such a structure makes it possible to reduce the number of steps for manufacturing a polarizing plate or LCD and to increase production efficiency. In addition, such a structure allows the polarizing plate to be thinner.

The polarizer is not particularly limited and various types can be used. Examples of the polarizer include: a film that is uniaxially stretched after a hydrophilic polymer film, such as a polyvinyl alcohol type film, a partially formalized polyvinyl alcohol type film, or an ethylene-vinyl acetate copolymer type partially saponified film, is allowed to adsorb a dichromatic substance such as iodine or a dichromatic dye; and a polyene type oriented film, such as a dehydrated polyvinyl alcohol film or a dehydrochlorinated polyvinyl chloride film. Particularly, a polarizer formed of a polyvinyl alcohol type film and a dichromatic material such as iodine is preferred because it has a high polarization dichroic ratio. The thickness of the polarizer is not particularly limited and is, for example, about 5 µm to 80 µm.

A polarizer that is obtained by dyeing a polyvinyl alcohol type film with iodine and then uniaxially stretching it can be produced as follows. For example, a polyvinyl alcohol type film is immersed in an aqueous solution of iodine to be dyed and is then stretched by 3 to 7 times the original length. The aqueous solution of iodine may contain, for example, boric acid, zinc sulfate, or zinc chloride, if necessary. Separately, the polyvinyl alcohol type film may be immersed in an aqueous solution containing, for example, boric acid, zinc sulfate, or zinc chloride. Furthermore, before dyeing, the polyvinyl alcohol type film may be immersed in water to be washed therein if needed. Washing the polyvinyl alcohol type film with water allows antiblocking agents and soils on the polyvinyl alcohol type film surface to be washed off and also provides an effect of preventing non-uniformity, such as unevenness in dyeing, from occurring by allowing the polyvinyl alcohol type film to swell. The polyvinyl alcohol type film may be stretched after being dyed with iodine, may be stretched while being dyed, or may be dyed with iodine after being stretched. Stretching can be carried out in an aqueous solution of, for example, boric acid or potassium iodide or in a water bath.

A different protective layer from the aforementioned light diffusion film may be provided on one surface of the polarizer. A transparent protective film can be used as the aforementioned protective layer. A preferable transparent protective film is one that is excellent in, for example, transparent, mechanical strength, thermal stability, moisture-blocking properties, and retardation value stability. Examples of the material for forming the transparent protective film include the same materials as those used for the aforementioned transparent plastic film substrate.

Moreover, examples of the transparent protective film also include polymer films described in JP 2001-343529 A (WO01/37007), incorporated herein by reference. The polymer films described in JP 2001-343529 A are formed of, for example, resin compositions containing (A) thermoplastic resins having at least one of a substituted imide group and a non-substituted imide group in the side chain thereof and (B) thermoplastic resins having at least one of a substituted phenyl group and a non-substituted phenyl group as well as a nitrile group in the side chain thereof. Examples of the polymer films formed of the resin compositions described above include one formed of a resin composition containing an acrylonitrile-styrene copolymer and an alternating copolymer composed of isobutylene and N-methyl maleimide. The polymer film can be produced by extruding the resin composition in the form of a film. The polymer film has a small retardation and a small photoelastic coefficient and thus can eliminate defects such as unevenness due to distortion when it is used as a protective film for, for example, a polarizing plate. The polymer film also has low moisture permeability and therefore has high moisture durability.

From the viewpoints of, for example, polarizing properties and durability, the transparent protective film is preferably a film made of cellulose resin such as TAC or a film made of norbornene resin. Examples of commercial products of the transparent protective film include FUJITAC (trade name) (manufactured by Fuji Photo Film Co., Ltd.), ZEONOA (trade name) (manufactured by Nippon Zeon Co., Ltd.), and ARTON (trade name) (manufactured by JSR Corporation).

The thickness of the transparent protective film is not particularly limited. It can be, for example, in the range of 1 µm to 500 µm from the viewpoints of strength, workability such as handling properties, and thin layer properties. In the above range, the transparent protective film can mechanically protect a polarizer and can prevent a polarizer from shrinking and retain stable optical properties even when exposed to high temperature and high humidity. The thickness of the transparent protective film is preferably in the range of 5 μm to 200 μm and more preferably in the range of 10 μm to 150 μm.

The configuration of a polarizing plate in which the light diffusion film is stacked is not particularly limited. For example, on the light diffusion film, a transparent protective film, the polarizer, and the transparent protective film may be stacked in this order. Alternatively, on the light diffusion film, the polarizer and the transparent protective film may be stacked in this order.

The liquid crystal display of the present invention may be the same configuration as conventionally known liquid crystal displays except that the light diffusion film of the present invention is used. That is, the liquid crystal display may be manufactured by suitably assembling each component, for example, optical members such as a liquid crystal cell, a polarizing plate, and the like, and a lighting system (for example, a backlight) as required and incorporating a driving circuit.

The liquid crystal display produced using a light diffusion film of the present invention may be used for any suitable applications that require a wide viewing angle. Examples of the applications include office equipment such as a PC monitor, a notebook PC, and a copy machine, portable devices such as a mobile phone, a watch, a digital camera, a personal digital assistant (PDA), and a handheld game machine, home electric appliances such as a video camera, a television set, and a microwave oven, vehicle equipment such as a back monitor, a monitor for a car-navigation system, and a car audio device, display equipment such as an information monitor for stores, security equipment such as a surveillance monitor, and nursing and medical equipment such as a monitor for nursing care and a monitor for medical use.

EXAMPLES

Next, examples of the present invention are described together with comparative examples. The present invention is neither limited nor restricted by the following Examples or Comparative Examples. Various properties and physical properties in the respective Examples and Comparative Examples were evaluated or measured by the following methods.

<Thicknesses of Photosensitive Resin Layer and Light Diffusion Film>

Using a digital micrometer ("K-351C" (trade name), manufactured by Anritsu Corporation), the whole thickness of the light diffusion film and the substrates between which the film is sandwiched was measured and the thickness of the substrates was subtracted from the whole thickness. Thus the thickness of the light diffusion film was calculated.

<Exposure Apparatus>

Figure 6:
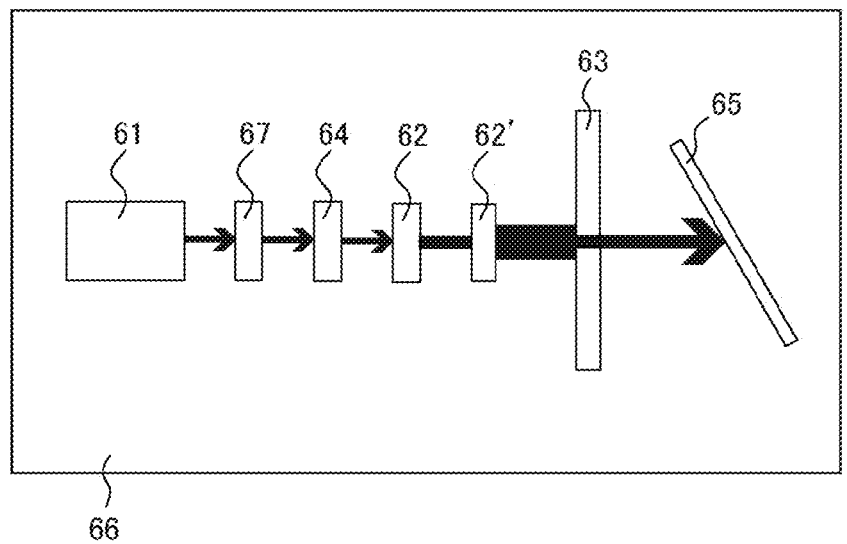
FIG. 6 is a schematic view of an exposure apparatus used for producing a light diffusion film in the examples of the present invention.

FIG. 6 shows a schematic view of an exposure apparatus used for producing a light diffusion film in Examples. A Nd:YVO$_4$ laser 61 (532 nm) (VERDI-V8, manufactured by Coherent Inc.) and Galileo-type beam expanders 62, 62' (3× (with an emission lens diameter of 20 mm) and 105× (with an emission lens diameter of 100 mm) manufactured by Sigma Koki Co., Ltd.) were attached to a vibration isolation table 66 (HOA-2010-150LA, manufactured by Sigma Koki Co., Ltd.) to expand a beam light. They were attached so that the laser beam thus expanded was allowed to pass through a window 63 with a size of 50×50 mm and thereby only a center region thereof with a substantially uniform light intensity was able to be emitted. In FIG. 6, the reference numeral 67 indicates a shutter. The lens was adjusted to obtain parallel light in all the planes after the laser beam passed through the aforementioned respective beam expanders 62, 62'. The parallel degree of the laser beam was checked using a collimation checker (SPV-25, manufactured by Sigma Koki Co., Ltd.). The light intensity of the laser beam was reduced by using a variable attenuator 64 (manufactured by Sigma Koki Co., Ltd.) and was adjusted to a predetermined value using a power meter (PH100-Si, manufactured by Gentec) and a monitor (SOLO, manufactured by Gentec). With respect to the in-plane exposure uniformity, an aperture with a diameter of 1 mm was attached to the power meter, measurement was performed with respect to 25 points located evenly in the plane of 50×50 mm, and thereby the error was confirmed to be 15% or less. Furthermore, the sample holder 65 was placed at an angle with respect to the laser beam.

<Measurement of Surface Roughness>

According to JIS B 0601 (1994 version), an average interval Sm (mm) between concaves and convexes and an arithmetic average surface roughness Ra (μm) were measured. Specifically, a glass sheet ("MICRO SLIDE GLASS" with a product number of S, a thickness of 1.3 mm, and a size of 45×50 mm, manufactured by Matsunami Glass Ind., Ltd.) was attached to the surface of the reflection hologram formation-preventing layer on which no unevenness had been formed, with a pressure-sensitive adhesive. Thus, a sample was produced. A stylus type surface roughness measuring instrument having a measuring needle with curvature radius R of a tip portion (diamond) of 2 μm (a high-precision microfigure measuring instrument "SURFCORDER ET4000" (trade name), manufactured by Kosaka Laboratory Ltd.) was used to measure a surface shape of the sample in a certain direction under a condition, in which a scan rate was 0.1 mm/sec, a cut off value was 0.8 mm, and a measurement length was 4 mm. Thus, the average interval Sm (mm) between concaves and convexes and the arithmetic average surface roughness Ra were obtained. The high-precision microfigure measuring instrument automatically calculates each measurement value.

<Haze Value>

A haze meter, "HM-150" (trade name) manufactured by Murakami Color Research Laboratory, was used to measure a haze value of the reflection hologram formation-preventing layer according to haze (cloudiness) defined in JIS K 7136 (2000 version).

<Color>

The side of the light diffusion film obtained from each Example and Comparative Example from which the original diffusion film is removed was attached on a black acrylic sheet ("Clarex" (trade name) with a thickness of 1.0 mm, manufactured by Nitto Jushi Kogyo Co., Ltd) with a pressure sensitive adhesive (No. 7, with a thickness of 23 μm, manufactured by Nitto Denko Corporation) interposed therebetween. Thus, a measurement sample was obtained. Color of the measurement sample was visually observed and evaluated according to the following evaluation criteria. When reflection hologram is formed, the black acrylic sheet looks blue to green.

Evaluation Criteria
AA: No color was observed
A: Color was observed a little but almost unnoticed
B: Color was observed
C: Deep color was observed <Reflectance and L*a*b* Color Difference>

Among each Example and Comparative Example, a reflectance and L*a*b* color difference (ΔE*ab) of the light diffusion film produced with the laser beam irradiating angle of 8° were measured as follows.

Among the measurement samples produced in the evaluation of color, the light diffusion film produced with the laser beam irradiating angle of 8° was set to a spectrophotometer with a jig for 8° incident diffusion reflection measurement ("U-4100", manufactured by Hitachi Ltd.) so that the direction of the incident laser beam at the time of producing approximately meets the direction of the incident laser beam at the time of measuring, and the reflectance and L*a*b* color difference (ΔE*ab) were measured. As for the reference, a white sheet (barium sulfate, manufactured by Hitachi Ltd.) was used. The peak top value of the spectral data thus obtained was read and was referred to as reflectance data. Further, ΔE*ab was calculated according to the measurement value of the film obtained in Reference Example.

Example 1

Production of Test Piece

Photopolymer NPN-005 manufactured by Nippon Paint Co., Ltd. was provided as a photosensitive resin. A light diffusion film ("AG30G" (trade name), with a thickness of 85 μm, manufactured by Nitto Denko Corporation) was provided as a reflection hologram formation-preventing layer. The photosensitive resin was applied to the reflection hologram formation-preventing layer using an applicator (an applicator manufactured by Tester Sangyo Co., Ltd.). This was dried with a heating apparatus (SPH-201, manufactured by Espec Corporation) at 90° C. for 5 minutes and thereby a 20-μm thick coated film (100×150 mm) was formed on the reflection hologram formation-preventing layer. Furthermore, a polyethylene terephthalate (PET) film (product number: S27W, with a thickness of 75 μm, manufactured by Toray Industries, Inc.) was laminated on the coated film surface of the reflection hologram formation-preventing layer with a pressure sensitive adhesive (No. 7, with a thickness of 23 μm, manufactured by Nitto Denko Corporation) interposed therebetween. A light diffusion film ("LSD20PE5" (trade name) with a half-value width of 20°, manufactured by Lumina) was attached as an original light diffusion film to the PET film surface, with a pressure sensitive adhesive (No. 7, with a thickness of 23 μm, manufactured by Nitto Denko Corporation) interposed therebetween. This was used as a test piece. The operation described above was performed in an environment in which an incandescent lamp (20 W) equipped with "Safe Light Glass" No. 3 manufactured by Asanuma & Co., Ltd. was used. The test piece thus produced was wrapped with aluminum foil to be prevented from being exposed.
<Production of Light Diffusion Film>

The surface of the test piece where the original light diffusion film had been attached was irradiated with light at a light intensity of 2.0 mW/cm², an accumulated light intensity of 27 mJ/cm², and an irradiation angle of 8° using the aforementioned exposure apparatus. Thereafter, the original light diffusion film, the reflection hologram formation-preventing layer, and the PET film were removed from the test piece and it was heated at 100° C. for 10 minutes on a glass sheet placed in a heating apparatus (SPH-201, manufactured by Espec Corporation). Subsequently, the whole surface of the heated test piece was irradiated with ultraviolet radiation at 4.0 J/cm² with an ultraviolet irradiation device (UVC-321AM1 (high pressure mercury lamp), manufactured by Ushio Inc.) and thereby a light diffusion film of this Example was obtained. The operations carried out up to before the ultraviolet irradiation were performed in an environment in which an incandescent lamp (20 W) equipped with "Safe Light Glass" No. 3 manufactured by Asanuma & Co., Ltd. was used, and the aluminum foil was used for wrapping during heating to prevent exposure.

Example 2

The light diffusion film of Example 2 was produced under the same condition as Example 1 except that a light diffusion film ("AGS1" (trade name) with a thickness of 86 μm, manufactured by Nitto Denko Corporation) was used as the reflection hologram formation-preventing layer.

Example 3

The light diffusion film of Example 3 was produced under the same condition as Example 1 except that a light diffusion film ("AGS2B" (trade name) with a thickness of 88 μm, manufactured by Nitto Denko Corporation) was used as the reflection hologram formation-preventing layer.

Example 4

The light diffusion film of Example 4 was produced under the same condition as Example 1 except that a light diffusion film ("AG150" (trade name) with a thickness of 85 μm, manufactured by Nitto Denko Corporation) was used as the reflection hologram formation-preventing layer.

Example 5

The light diffusion film of Example 5 was produced under the same condition as Example 1 except that a light diffusion film ("AG200" (trade name) with a thickness of 105 μm, manufactured by Nitto Denko Corporation) was used as the reflection hologram formation-preventing layer.

Example 6

The light diffusion film of Example 6 was produced under the same condition as Example 1 except that a light diffusion film ("ARC150T" (trade name) with a thickness of 85 μm, manufactured by Nitto Denko Corporation) was used as the reflection hologram formation-preventing layer.

Example 7

The light diffusion film of Example 7 was produced under the same condition as Example 1 except that a light diffusion film ("ARC270" (trade name) with a thickness of 105 μm, manufactured by Nitto Denko Corporation) was used as the reflection hologram formation-preventing layer.

Example 8

A light diffusion film ("H50" (trade name) with separators on both sides and a thickness of 99 μm, manufactured by Nitto Denko Corporation) was used as the reflection hologram formation-preventing layer. The photopolymer was applied to the PET film and dried under the same condition as Example 1, and thereby a coated film was obtained. The light diffusion film "H50", from which the separator of one side was removed, was laminated on the coated film surface of the PET film, and an original light diffusion film was attached to the surface of the PET film in the same manner as in Example 1. This was used as a test piece. Other than these, the light diffusion film of Example 8 was produced under the same condition as Example 1.

Example 9

The light diffusion film of Example 9 was produced under the same condition as Example 1 except that a light diffusion film ("H80" (trade name) with a thickness of 99 μm, manufactured by Nitto Denko Corporation) was used as the reflection hologram formation-preventing layer.

Example 10

The light diffusion film of Example 10 was produced under the same condition as Example 4 except that the irradiation angle was set at 15°.

Example 11

The light diffusion film of Example 11 was produced under the same condition as Example 4 except that the irradiation angle was set at 30°.

Example 12

The light diffusion film of Example 12 was produced under the same condition as Example 4 except that the irradiation angle was set at 45°.

Example 13

The light diffusion film of Example 13 was produced under the same condition as Example 1 except that a black tape (black vinyl tape "SPVAW303" (trade name) with a thickness of 113 μm, manufactured by Nitto Denko Corporation) was used as the reflection hologram formation-preventing layer, and the irradiation angle was set at 30°.

Comparative Example 1

The light diffusion film of Comparative Example 1 was produced under the same condition as Example 1 except that a PET film (product number: S27W, with a thickness of 75 μm, manufactured by Toray Industries, Inc.) was used instead of the reflection hologram formation-preventing layer.

Comparative Example 2

The light diffusion film of Comparative Example 2 was produced under the same condition as Comparative Example 1 except that the irradiation angle was set at 15°.

Comparative Example 3

The light diffusion film of Comparative Example 3 was produced under the same condition as Comparative Example 1 except that the irradiation angle was set at 30°.

Comparative Example 4

The light diffusion film of Comparative Example 4 was produced under the same condition as Comparative Example 1 except that the irradiation angle was set at 45°.

Reference Example

Photopolymer NPN-005 manufactured by Nippon Paint Co., Ltd. was provided as a photosensitive resin. The photopolymer was applied to a light diffusion film ("AG30G" (trade name), with a thickness of 85 μm, manufactured by Nitto Denko Corporation) using an applicator (an applicator manufactured by Tester Sangyo Co., Ltd.). This was dried with a heating apparatus (SPH-201, manufactured by Espec Corporation) at 90° C. for 5 minutes and thereby a 20-μm thick coated film (100×150 mm) was formed on the light diffusion film. Furthermore, a polyethylene terephthalate (PET) film (product number: S27W, with a thickness of 75 μm, manufactured by Toray Industries, Inc.) was laminated on the coated film surface of the light diffusion film with a pressure sensitive adhesive (No. 7, with a thickness of 23 μm, manufactured by Nitto Denko Corporation) interposed therebetween. This was used as a test piece. The operation described above was performed in an environment in which an incandescent lamp (20 W) equipped with "Safe Light Glass" No. 3 manufactured by Asanuma & Co., Ltd. was used. The test piece thus produced was wrapped with aluminum foil to be prevented from being exposed. Thereafter, the light diffusion film was removed from the test piece and it was heated at 100° C. for 10 minutes on a glass sheet placed in a heating apparatus (SPH-201, manufactured by Espec Corporation). Subsequently, the whole surface of the heated test piece was irradiated with ultraviolet radiation at 4.0 J/cm² with an ultraviolet irradiation device (UVC-321AM1 (high pressure mercury lamp), manufactured by Ushio Inc.) and thereby a film of Reference Example was obtained. The operations carried out up to before the ultraviolet irradiation were performed in an environment in which an incandescent lamp (20 W) equipped with "Safe Light Glass" No. 3 manufactured by Asanuma & Co., Ltd. was used, and the aluminum foil was used for wrapping during heating to prevent exposure. Properties of the reflection hologram formation-preventing layers used in Examples and Evaluation results of the light diffusion films obtained in Examples and Comparative Examples are summarized in Table 1.

TABLE 1

| | Irradiation Angle (°) | Reflection hologram formation-preventing layer | Sm (mm) | Ra (μm) | Haze (%) | Antireflection treatment | Color | Reflectance (%) | L* | a* | b* | ΔE*ab*[1] |
|---|---|---|---|---|---|---|---|---|---|---|---|---|
| Example 1 | 8 | AG30G | 0.0651 | 0.26 | 7.5 | Not applied | B | 6.9 | 23.52 | 10.60 | −18.38 | 20.56 |
| Example 2 | 8 | AGS1 | 0.0719 | 0.34 | 25 | Not applied | A | 5.9 | 25.18 | 7.95 | −14.42 | 15.84 |
| Example 3 | 8 | AGS2B | 0.0594 | 0.20 | 12 | Not applied | A | 5.5 | 24.58 | 9.44 | −16.15 | 18.05 |
| Example 4 | 8 | AG150 | 0.0604 | 0.13 | 43 | Not applied | A | 4.7 | 25.07 | 10.59 | −18.62 | 20.78 |
| Example 5 | 8 | AG200 | 0.0586 | 0.08 | 42 | Not applied | A | 4.9 | 24.76 | 11.02 | −19.10 | 21.40 |
| Example 6 | 8 | ARC150T | 0.0668 | 0.15 | 41 | Applied | A | 5.1 | 24.78 | 7.02 | −13.19 | 14.29 |
| Example 7 | 8 | ARC270 | 0.1038 | 0.10 | 23 | Applied | AA | 4.4 | 24.39 | 3.72 | −7.82 | 7.98 |
| Example 8 | 8 | H50 | — | 0.00 | 51 | Not applied | A | 6.6 | 25.00 | 8.03 | −14.63 | 16.05 |
| Example 9 | 8 | H80 | — | 0.00 | 80 | Not applied | B | 7.8 | 24.84 | 8.61 | −17.68 | 18.99 |

TABLE 1-continued

| | Irradiation Angle (°) | Reflection hologram formation-preventing layer | Sm (mm) | Ra (μm) | Haze (%) | Antireflection treatment | Color | Reflectance (%) | L* | a* | b* | ΔE*ab*[1] |
|---|---|---|---|---|---|---|---|---|---|---|---|---|
| Example 10 | 15 | AG150 | 0.0604 | 0.13 | 43 | Not applied | A | | | | | |
| Example 11 | 30 | AG150 | 0.0604 | 0.13 | 43 | Not applied | A | | | | | |
| Example 12 | 45 | AG150 | 0.0604 | 0.13 | 43 | Not applied | A | | | | | |
| Example 13 | 30 | Black tape | — | — | — | Not applied | AA | | | | | |
| Comparative Example 1 | 8 | (PET) | — | — | — | — | C | 9.1 | 24.98 | 11.57 | −20.08 | 22.53 |
| Comparative Example 2 | 15 | (PET) | — | — | — | — | C | | | | | |
| Comparative Example 3 | 30 | (PET) | — | — | — | — | B | | | | | |
| Comparative Example 4 | 45 | (PET) | — | — | — | — | C | | | | | |
| Reference Example | No irradiation | — | — | — | — | — | AA | | 23.91 (=$L^*_0$) | −0.02 (=$a^*_0$) | −0.79 (=$b^*_0$) | 0.00 |

*[1] $\Delta E^*ab = [(L^* - L^*_0)^2 + (a^* - a^*_0)^2 + (b^* - b^*_0)^2]^{1/2}$ As can be seen from the Table 1, with respect to the measurement samples provided with the light diffusion films of Examples, a phenomenon in which a black acrylic sheet looks blue to green less occurs at the time of visual observation. When reflection hologram is formed, incident light reflects due to the reflection hologram. Since the reflection hologram is a diffraction grating, it causes color due to occurrence of wavelength dependence in reflectance. It can be said that the black acrylic sheets are less colored and formation of the reflection hologram is prevented in Examples. Further, with respect to samples whose reflectance and ΔE*ab were measured, reflectance of the measurement samples of Examples is suppressed as compared to the measurement samples of Comparative Examples and the ΔE*ab value of the measurement samples of Examples is also small. This means that wavelength dependence of the reflected light is small in the measurement samples of Examples, and it shows that formation of the reflection hologram is prevented. The light diffusion film of the present invention is used suitably for a liquid crystal display. Examples of the applications thereof include, for example, office equipment such as a PC monitor, a notebook PC, and a copy machine, portable devices such as a mobile phone, a watch, a digital camera, a personal digital assistant (PDA), and a handheld game machine, home electric appliances such as a video camera, a television set, and a microwave oven, vehicle equipment such as a back monitor, a monitor for a car-navigation system, and a car audio device, display equipment such as an information monitor for stores, security equipment such as a surveillance monitor, and nursing and medical equipment such as a monitor for nursing care and a monitor for medical use. According to the method of manufacturing a light diffusion film of the present invention, a light diffusion film having the aforementioned applicability can be manufactured by a continuous process without difficulty. That is, the light diffusion film of the present invention is suitably used for the aforementioned display device with a big screen. The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A method of manufacturing a light diffusion film, wherein the method comprises:
   forming a laminate of an original light diffusion film and a photosensitive resin, wherein the photosensitive resin comprises at least two types of materials that are different in refractive index from each other; and
   irradiating the laminate with a collimated laser beam from a side of the original light diffusion film,
   wherein a reflection hologram formation-preventing layer is located on a side of the laminate opposite from the side of irradiation of the laminate with a collimated laser beam wherein in the process of irradiating the laminate the reflection hologram formation-preventing layer prevents formation of a reflection hologram on the photosensitive resin due to a reflected light from the irradiation,
   wherein the reflection hologram formation-preventing layer is a layer with surface unevenness, and
   wherein the surface unevenness has Sm (mm) in a range from 0.001 to 1 and Ra (μm) in the range from 0.01 to 10.

2. The method of manufacturing a light diffusion film according to claim 1,
   wherein the reflection hologram formation-preventing layer is made with an antireflection treatment on a surface thereof.

3. The method of manufacturing a light diffusion film according to claim 1,
   wherein in the process of irradiating, the laser beam is irradiated at a predetermined angle with respect to a normal line of a surface of the laminate.

4. The method of manufacturing a light diffusion film according to claim 1,
   wherein the original light diffusion film is at least one selected from the group consisting of a surface hologram, a volume hologram, a diffraction grating, a surface uneven film, a light diffusion film containing particles, and a surface uneven film containing particles.

5. The method of manufacturing a light diffusion film according to claim 1, wherein the original light diffusion film is at least one selected from the group consisting of a light diffusion film containing particles, and a surface uneven film containing particles;
   wherein said particles are at least one of the group consisting of silica, calcium oxide, alumina, titania, zirconia, tin oxide, indium oxide, cadmium oxide, antimony oxide, polymethylmethacrylate and polyurethane;

and wherein an average particle diameter of the particles is 0.01 μm to 20 μm.

6. A light diffusion film manufactured by the method of manufacturing a light diffusion film according to claim 1.

7. The light diffusion film according to claim 6, wherein a surface of the light diffusion film is applied with an antireflection treatment.

8. The light diffusion film according to claim 6, wherein the light diffusion film is a directional light diffusion film having incident angle dependence.

9. A polarizing plate comprising a polarizer and a protective layer that are stacked together, wherein the protective layer is the light diffusion film according to claim 6.

10. The polarizing plate according to claim 9, wherein the protective layer is stacked on two surfaces of the polarizer and at least one of the protective layers is the light diffusion film according to claim 6.

11. A liquid crystal display comprising a polarizing plate, wherein the polarizing plate is the polarizing plate according to claim 9.

12. A liquid crystal display comprising a light diffusion film, wherein the light diffusion film is the light diffusion film according to claim 6.

13. A light diffusion film manufactured by the method of manufacturing a light diffusion film according to claim 1, wherein the reflection hologram formation-preventing layer is an antiglare layer.

14. The method of manufacturing a light diffusion film according to claim 1, wherein a layer having the photosensitive resin itself comprises the reflection hologram formation-preventing layer.

15. The method of manufacturing a light diffusion film according to claim 1, wherein a layer having the photosensitive resin itself has an unevenness on a surface thereof.

* * * * *